Aug. 11, 1936.    J. W. SLAYTON, JR    2,050,673
TRANSMISSION MECHANISM
Filed July 29, 1932    4 Sheets-Sheet 1

Aug. 11, 1936.    J. W. SLAYTON, JR    2,050,673
TRANSMISSION MECHANISM
Filed July 29, 1932    4 Sheets-Sheet 2

J. W. Slayton, Jr. Inventor

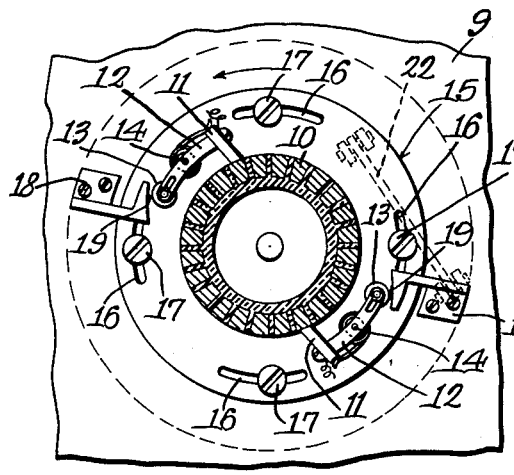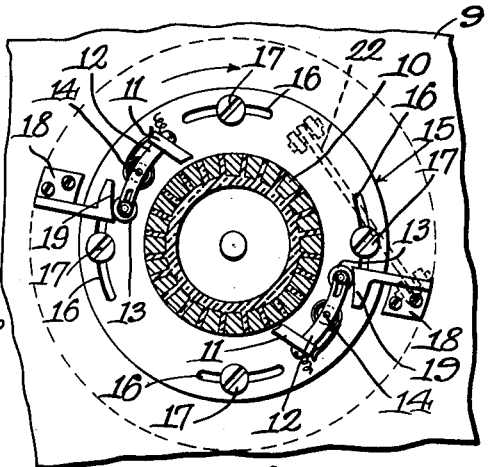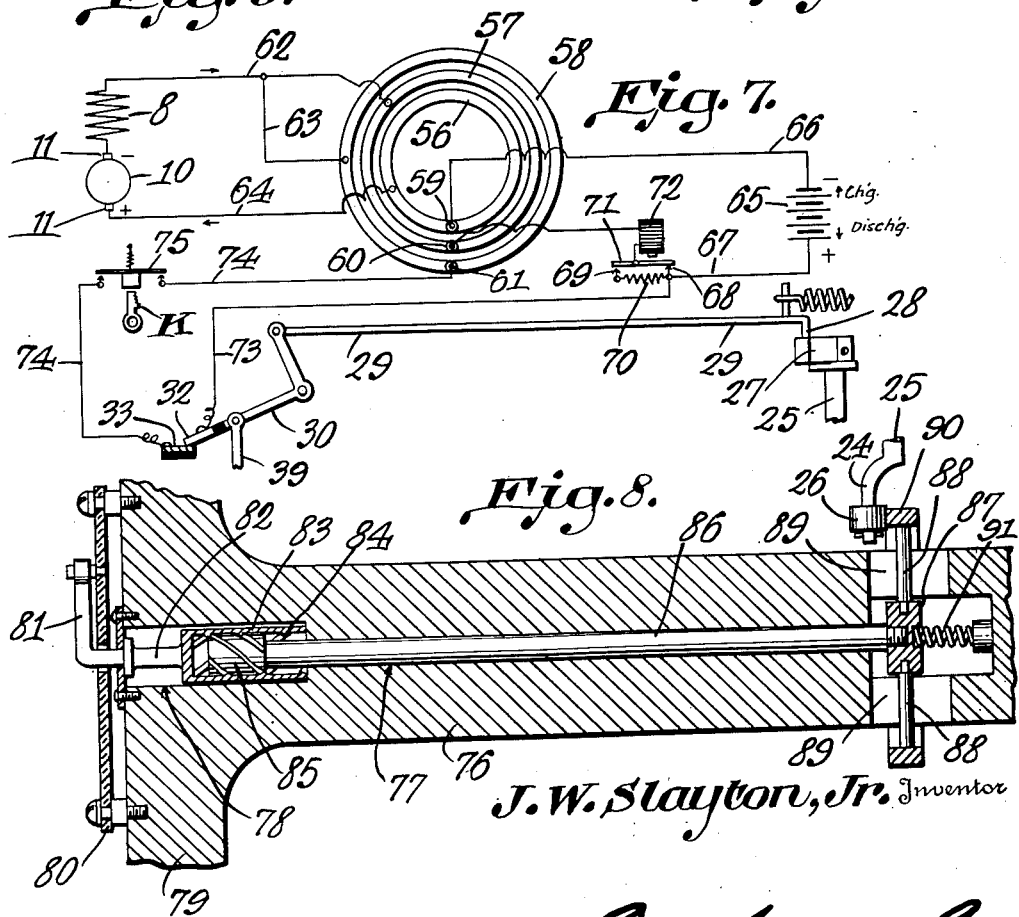

Aug. 11, 1936.  J. W. SLAYTON, JR  2,050,673
TRANSMISSION MECHANISM
Filed July 29, 1932    4 Sheets-Sheet 4

J. W. Slayton, Jr. Inventor

By C. A. Snow & Co.
Attorneys.

Patented Aug. 11, 1936

2,050,673

UNITED STATES PATENT OFFICE 2,050,673

TRANSMISSION MECHANISM

John W. Slayton, Jr., Pittsburgh, Pa.

Application July 29, 1932, Serial No. 626,123

6 Claims. (Cl. 172—239)

This invention relates to a transmission mechanism designed more especially for use on motor vehicles although it can be employed wherever found to be advantageous.

It is an object of the invention to provide a highly flexible mechanism utilizing the torque between the freely rotatable armature and field of a short-circuited dynamo, in lieu of the gears heretofore generally employed, for operatively connecting the driving and driven parts.

A further object is to maintain easy power control by utilizing shiftable brushes readily adjustable to their most favorable positions or to dead spots on the commutator of the dynamo, thereby preventing overheating and consequent waste of power and avoiding magnetic forces which would tend to interfere with the control of the mechanism.

Another object is to utilize an armature and a field each freely rotatable but so disposed that any variation in relative rotation will cause the generation of E. M. F. which, when collected, and short circuited back into the field, produces a magnetic torque.

A still further object is to increase the power of generation between the field and armature in proportion to the increase in the load.

Another object is to provide a transmission mechanism which can be shifted directly from neutral or any one speed to any other speed or into reverse without causing injury to the apparatus and producing abrupt speed changes.

A further object is to provide a governor controlled compensating means, whereby the position of the commutator brushes is automatically regulated with regard to the speed of both the driving and the driven shafts.

A further object is to provide a governor controlled compensating means which is responsive to a speed difference between the drive shaft and the driven shaft, without manual adjustment.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings:

Figure 4 is a section through the controlling governor.

Figure 5 is an enlarged section on line 5—5, Figure 2, showing the brushes in normal positions.

Figure 6 is a similar view showing the brushes in retarding position.

Figure 7 is a diagram of the electric circuit.

Figure 8 is a section through the drive shaft showing a modified portion of the control mechanism.

Figure 1:
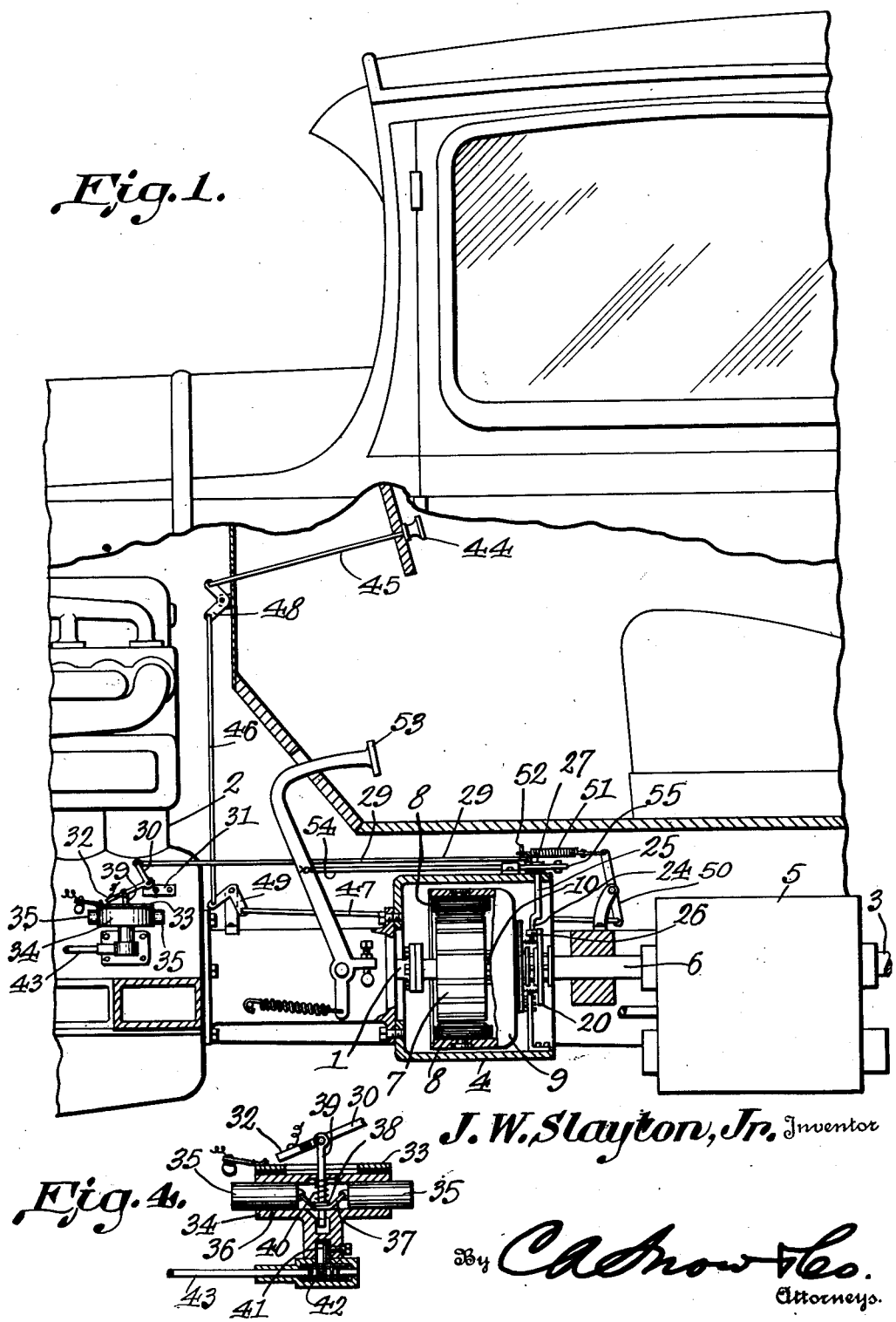
Figure 1 is a view partly in section and partly in elevation of the complete apparatus installed in a motor vehicle.
Figure 2:
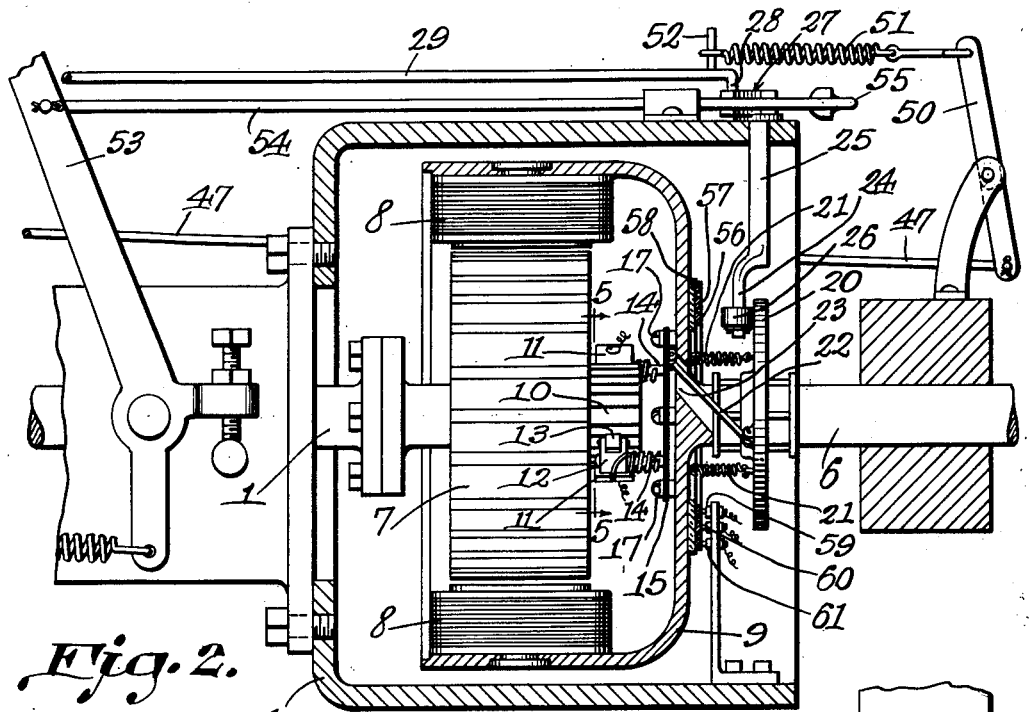
Figure 2 is an enlarged section through a portion of the apparatus showing the rotatable armature and field and the brush operating mechanism.
Figure 3:
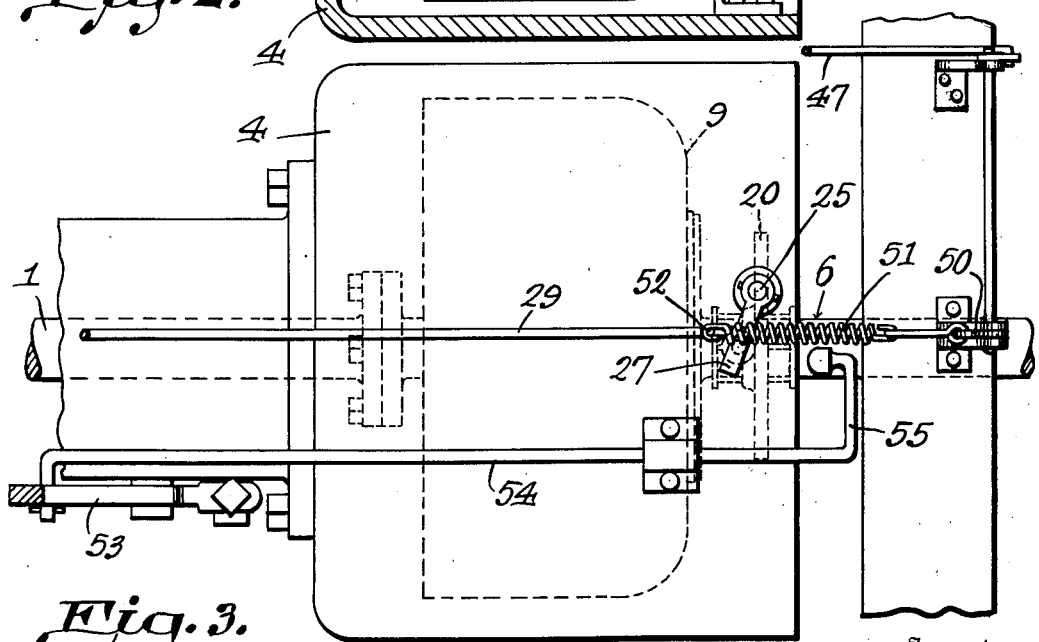
Figure 3 is a plan view of the structure shown in Figure 2.

The present apparatus includes a drive shaft 1 leading from the engine 2, a driven shaft 3 leading to the differential or other operated part, and the interposed transmission made up of the housing 4 containing the electric clutch in the form of a dynamo, the housing 5 containing the reversing apparatus, and the intermediate shaft 6 joining the two apparatus.

Shaft 1 is secured to the armature 7 of the dynamo so that the two will rotate together, and the field 8 is carried by supporting member 9 which is secured to and rotates with intermediate shaft 6. The armature and field are made of sufficient power to do the required work.

The commutator has been shown at 10 and is engaged by brushes 11 each connected to one end of a lever 12. The other end of each lever preferably is provided with an anti-friction roller 13 constituting an adjustable counterbalancing weight for the brush. Each lever is fulcrumed between its ends on a post 14 and these posts extend from a disk 15 formed of insulating material. Arcuate slots 16 are provided in the disk and guide bolts 17 are seated therein and in the member 9 so as to support the disk 15 for limited back and forth rotation about the axis of the commutator 10. By utilizing counterbalancing weights for the brushes 11 said brushes will maintain a uniform pressure upon the commutator at all speeds and there results a greatly reduced friction and wear on the commutator surface as compared with other types of brushes.

Brackets 18 are secured to member 9 and have deflectors 19 extending into the paths of the weights or rollers 13. When the parts are in their normal positions the weights or rollers are spaced from these deflectors, as in Figure 5.

A control disk or ring 20 is feathered on shaft 6 so as to rotate therewith but slide thereon. Springs 21 connect the ring to member 9 so as to draw it normally toward said member. A connecting rod 22 is pivotally connected at one end to the ring 20 and at its other end to disk 15 and is inclined relative to the planes of the ring and disk so that when the ring is shifted along its shaft 6 the rod will act either to thrust against or pull upon the disk and rotate it to the left or to the right as viewed in Figure 5. This rod works in an opening 23 in member 9 of sufficient size to permit free movement of the rod when actuated.

The ring 15 is adapted to be shifted against the action of its springs by a crank arm 24 at one end of a rock shaft 25 journaled in housing 4. A roller 26 is carried by the crank arm for pressure against the ring 20 and an arm 27 is secured to the outer end of the shaft. The downturned end 28 of a rod 29 is extended into arm 27 and this rod is extended to one arm of a bellcrank 30 fulcrumed on a fixed bracket 31. The other arm of the bellcrank has a contact 32 adapted to move into and out of engagement with a contact ring 33 mounted on but insulated from a governor disk 34 and which can be utilized in any manner desired.

Slides 35 are extended radially within a diametrical bore 36 in disk 34 and are connected at their inner ends by a flexible strap 37 supporting a collar 38 on a stem 39. This stem is slidable in the disk along its axis of rotation and a spring 40 serves to press the collar 38 normally against the strap to hold the slides retracted.

Disk 34 is secured to and rotates with a shaft 41 coaxial therewith and receiving motion through worm gearing 42 from a shaft 43 actuated by engine 2. Thus as the speed of the engine increases the slides 35 will move apart by centrifugal force and lift through strap 37 upon collar 38, stem 39 and bellcrank 30. Motion will in turn be transmitted through rod 29 to arm 27 and shaft 25, thus causing ring 20 to shift along shaft 6 and actuate rod 22 to rotate disk 15. The governor is of a type not affected by rough travel.

In addition to the means for automatically shifting ring 15 there is provided a button 44 operatively connected by any suitable means, such as rods 45, 46, and 47, and bellcranks 48 and 49, to a lever 50 having a spring connection 51 with a pin 52 on rod 29. Thus it is possible for the driver to pull yieldingly on rod 29 to vary the effectiveness of the governor by increasing or reducing the resistance to the movement of ring 20. This is particularly useful when traversing hilly country.

A foot pedal 53 is located where it can be depressed to shift a rod 54 having a finger 55 extending back of but normally spaced from arm 27. Thus while the finger normally will not interfere with the automatic operation of the governor controlled mechanism, it can be actuated by pressing on pedal 53 so as to come against and shift arm 27 and move the brushes into complete retard, as hereinafter explained.

Collector rings 56, 57, and 58 rotate with member 9 and are coaxial therewith. Separate contacts 59, 60, and 61 cooperate therewith as shown.

The usual or any preferred winding of the armature and field can be employed and in order that the dynamo may be utilized as a battery charger, the circuit illustrated in Figure 7 is employed. As shown in said figure the field 8 is electrically connected by lead 62 to ring 57, and by a lead 63 to ring 58. The lead 64 extending from the positive brush of the commutator is connected to the inner ring. The battery 65 has its negative terminal connected by lead 66 to ring 56 while its positive terminal is connected by a lead 67 to a contact 68. Another contact 69 is joined to contact 68 by a hot-wire resistance 70 and a pivoted armature 71 normally engages contact 68 and connects it electrically to magnet 72 which, in turn, is connected to ring 57. When the magnet is over-energized it will attract its armature to break the circuit at contact 68 and close the circuit at contact 69. The contact 32 on lever 30 of the governor controlled mechanism is electrically connected by a lead 73 to contact 68 and the contact 33 has a lead 74 extending to ring 58. This lead 74 includes a switch 75 adapted to be closed by any suitable means, such as a key K.

Obviously when the engine is operated and the armature 7 rotated relative to its field 8 the generated current will flow from field 8 to ring 57, magnet 72 and lead 67 to battery 65, the circuit being completed back through lead 66, ring 56 and lead 64 to the commutator. The charging current to the battery can be automatically limited by magnet 72 which is so wound that, when over-energized, it will attract its armature 71, break the circuit at 68 and make contact at 69. Thus the hot-wire resistance 70 will be brought into action.

When arm 27 is in its full forward position the crank arm 24 is also in forward position so that springs 21 can act to pull the ring 20 toward member 9 thereby to thrust through rod 22 against disk 15 and rotate it to thrust rollers 13 against deflectors 19 and move the brushes off the commutator. Consequently when the engine is started the armature will rotate relative to its field without affecting the same. The governor disk 34 will be rotated by the engine and the slides 35 will move outwardly by centrifugal force. This will cause strap 37 to be pulled taut and to lift stem 39 against the action of its spring 38. Consequently the contacts 32 and 33 will become disengaged automatically.

The elevation of contact 32 and consequent actuation of lever 30 will cause a thrust through rod 29 against arm 27 and this will cause roller 26 to press back against collar 20 and pull through rod 22 upon disk 15. Said disk will be given a clockwise movement from the position shown in Figure 6 toward the position shown in Figure 5, thereby depositing the brushes on the commutator.

The torque set up between the rotating armature and its rotatable field will result in gradually picking up the field until the armature and field rotate in unison.

The armature and field are built powerful enough to hold the engine at a desired speed difference while a maximum flow of current or "full throttle" condition is being maintained. As less power is needed it is necessary only to relieve some of the attraction between the armature and its field in order to prevent the field from approaching too closely the speed of the armature. This is accomplished by shifting the brushes to less favorable positions on the commutator, such adjustment being automatically controlled by the engine operated governor, as explained or by actuation of the button 44 when for any reason, an abrupt shift is desired.

It will be apparent that by utilizing the means described the speed of the vehicle can be changed quickly from neutral to any speed and vice versa, the action being gradual because of the flexibility of the drive and yet being at all times under perfect control.

Instead of shifting the disk 15 by means of the rod 22 a modified mechanism such as shown in Figure 8 can be used. In this structure the intermediate shaft 76 has an axial bore 77 one end of which is counterbored at 78 and opens through the field carrying member 79. Rotatable disk 80, corresponding with disk 15, is connected to a crank arm 81 at one end of a spindle 82 extending from a sleeve 83 which is rotatable in counterbore 78. This sleeve does not move longitudinally but has means, such as an interior thread 84 for engagement by a slidable worm 85 on one end of a rod 86. This rod is slidable in bore 77 and is connected to a head 87 in shaft 76. Radial pins 88 extend from the head through slots 89 to a collar 90 corresponding with collar 20. This is adapted to be operated by the same mechanism hereinbefore described which includes roller 26 and crank arm 24. A spring 91 exerts a thrust against head 87 to hold the rod 86 pressed normally in one direction. When the rotating collar 90 is thrust back by roller 26 the worm 85 will rotate the sleeve 83 and cause arm 81 to rotate disk 80, thereby shifting the commutator brushes carried thereby.

Figure 9:
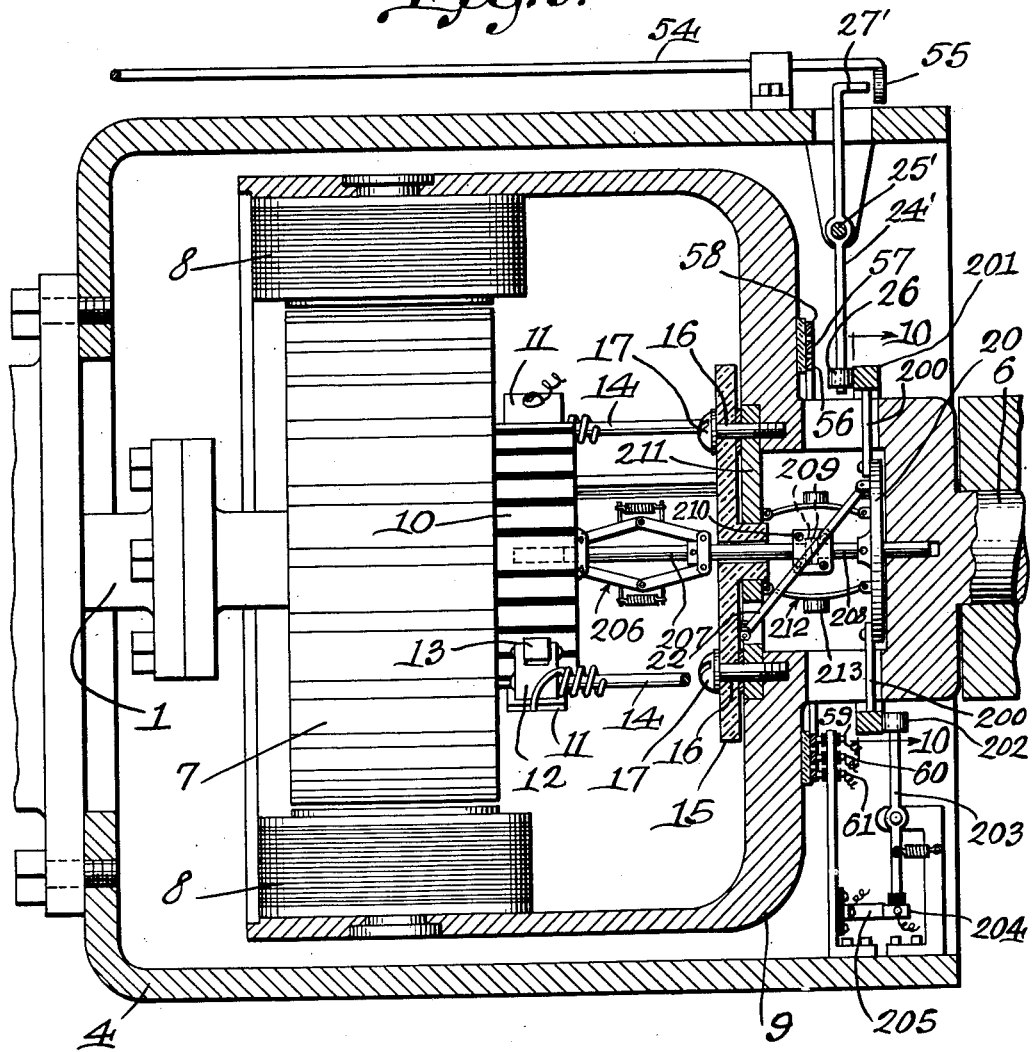
Figure 9 is a longitudinal sectional view of a modified form of the invention.
Figure 10:
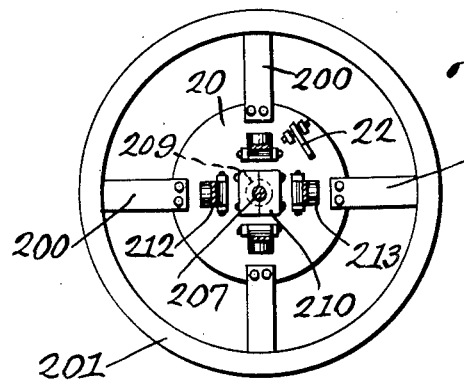
Figure 10 is a cross section on the line 10—10, Figure 9.

Figures 9 and 10 show a further modified form of the invention wherein the operation is simplified by the introduction of automatic means for shifting the brushes as car speed or road conditions demand.

In the drawings, similar numerals have been used in referring to parts similar to those used in other figures.

The numeral 1 indicates a drive shaft extending from an engine and rotating internally of a housing 4 wherein is located the parts comprising the electric clutch.

A driven shaft 6 is supported in axial alignment with the drive shaft 1 and has secured thereto a supporting member 9 which in turn carries a series of field windings 8.

The drive shaft 1 carries for rotation, within the influence of the field windings 8, an armature 7 upon one end of which is secured a commutator 10.

Brushes 11 are carried upon levers 12 which are pivoted on posts 14, the levers 12 carrying at their ends opposite to the brushes 11 anti-friction rollers 13, as has been hereinbefore described.

A brush holder plate 15 is mounted within the supporting member 9 concentrically with the armature 7 and commutator 10.

The brush holder plate 15 is provided with arcuate slots 16 for the reception of guide bolts 17 which will permit the plate 15 a limited movement.

A control disk 20 is carried within the supporting member 9 and is provided with outstanding radial arms 200 which secure the control disk 20 to a ring 201.

When the device is in its normal or inoperative position, as shown in Figure 9, the ring 201 is in contact with a roller 202 on a pivoted circuit-closing lever 203.

This lever 203 carries at its end, opposite to the roller 202, a contact element 204 which cooperates with a contact element 205, these parts being utilized in any desired manner.

A primary governor 206 is carried by the commutator 10 and has a sliding shaft 207 rotatable with the governor and slidable within the commutator as the speed and position of the governor demands.

A second shaft 208 is carried by the supporting member 9 for sliding movement therein, and is rotated with the control disk 20 and associated parts during rotation of the driven shaft 6.

Secured to the abutting ends of the shafts 207 and 208 are enlargements 209 confined within a coupling 210, which permits independent rotation of the shafts while causing similar longitudinal movements.

A plate 211 is held in place in the supporting member 9 by the guide bolts 17 and constitutes a backing for one end of a secondary governor 212. The opposite end of the secondary governor is connected to the control disk 20 and because of its spring action tends normally to thrust against the control disk 20 and hold it in the position shown in Figure 9.

The secondary governor consists of any desirable number of spring plates, secured at their ends to the plate 211 and to the control disk 20. The spring plates are provided with weights 213 at their centers to overcome the normal thrust of the spring plates when the driven shaft 6 has reached a predetermined speed.

It will be noted that two different governor types are illustrated, but it is to be understood that any form of governor capable of performing the necessary functions may be substituted.

If it is desired at any time to render the clutch inoperative the control disk 20 is returned to its normal position by means of a lever 24' which is pivoted at 25'. The lever 24' carries an antifriction roller 26 on its lower end for engagement with the ring 201. At its upper end the lever 24' carries an offset 27' which is engaged by a finger 55 secured to one end of a rod 54. The rod 54 may be operated by a foot pedal or a knob on the instrument board as desired.

The operation of this form of the invention is as follows:

When the engine is started it causes rotation of the drive shaft 1, the armature 7, the commutator 10, the primary governor 206 and the sliding shaft 207. The coupling 210 permits this rotation without rotation of the second shaft 208.

As the engine starts the primary governor 206 is thrown out by centrifugal force and causes the shafts 207 and 208 to slide toward the commutator. This movement is limited by the resistance offered by the secondary governor, but the movement is sufficient to break the contact between the contacts 204 and 205.

This limited movement of the shaft 208 and the control disk 20 also causes a rotation of the brush holder plate 15 sufficient to lower the brushes 11 onto the commutator 10.

The brush structure is similar to that already described and a detailed description is thought unnecessary.

During this operation the secondary governor 212 has resisted the effort of the primary governor 206 to slide the control disk 20, rotate the brush holder plate 15 and change the position of the brushes 11 on the commutator.

However, when the speed of the driven shaft reaches a predetermined point the weights 213 move outwardly, bending the spring plates of the secondary governor and permitting the primary governor to draw the control disk 20 toward the commutator, thus moving the brushes 11 to a more favorable position on the commutator.

When hilly or heavy going is encountered, the driven shaft is slowed down and unless more gas is given the engine, it too, will slow down. As the throttle is opened, the engine shaft rotates faster and consequently tends to expand the primary governor further. The secondary governor does not yield to the primary governor until the added power affects the driven shaft; therefore there is an interval when the brush movement is slow, resulting in a higher ratio during the pick-up period, which is desirable. As the driven shaft responds to the increased power, the ratio is again decreased.

This balance and counterbalance of the two governors results in an innumerable number of ratios, each precisely correct for the particular nature of the road traversed, and at all times keeping the engine at its most efficient speed.

What is claimed is:

1. Transmission mechanism including a motor operated drive shaft, a driven shaft, an electric clutch in the form of a dynamo having its armature and commutator rotatable with one shaft and its field rotatable with the other shaft, brushes pivotally supported relative to the field and commutator, means for advancing or retracting the brushes relative to the armature to more or less effective positions, and means operated by the movement of the brushes in one direction for disengaging them from the commutator.

2. Transmission mechanism including a motor operated drive shaft, a driven shaft, an electric clutch in the form of a dynamo having its armature and commutator rotatable with one shaft and its field rotatable with the other shaft, brushes tiltably mounted, counterbalances therefor means controlled by the speed of the drive shaft for advancing or retracting the brushes circumferentially of the commutator, and means operated by the movement of the brushes in one of said directions for disengaging them from the commutator.

3. A transmission including a driving element, and a driven element, a dynamo operatively connected to both of said elements and constituting an electric clutch, the armature and field of the dynamo maintaining a torque commensurate with the load, movable brushes for engaging the commutator of the dynamo, and governor operated means for moving the brushes circumferentially of and toward and from the commutator.

4. Transmission mechanism including a motor operated drive shaft, a driven shaft, an electric clutch in the form of a dynamo having its armature and commutator rotatable with one shaft and its field rotatable with the other shaft, brushes movably supported relative to the commutator, a primary governor rotatable with the armature, a secondary governor rotatable with the field, and means operable by either governor for shifting the brushes relative to the commutator.

5. Transmission mechanism including a motor operated drive shaft, a driven shaft, an electric clutch in the form of a dynamo having its armature and commutator rotatable with one shaft and its field rotatable with the other shaft, a primary governor rotatable with the commutator, a secondary governor rotatable with the field, brushes carried by the field and cooperating with the commutator, a disk rotatable with the field, means operated by both governors for imparting a limited rotation to the disk relative to the field, and means actuated by the disk for shifting the brushes relative to the commutator.

6. Transmission mechanism including a motor operated drive shaft, a dynamo having its armature and commutator rotatable with said shaft, a driven shaft carrying the field of the dynamo, said dynamo constituting an electric clutch, brushes rotatable with the field and cooperating with the commutator, separate centrifugal governors rotatable with the armature and field respectively, and means operated by either or both of said governors for shifting the brushes into or out of their most advantageous positions on the commutator.

JOHN W. SLAYTON, Jr.